(No Model.)

U. BOHREN.
FAUCET.

No. 256,873. Patented Apr. 25, 1882.

Witnesses
Chas H Smith
J. Hail

Inventor.
Ulrich Bohren.
per Lemuel W. Serrell
atty ent text.

UNITED STATES PATENT OFFICE.

ULRICH BOHREN, OF NEW YORK, N. Y.

FAUCET.

SPECIFICATION forming part of Letters Patent No. 256,873, dated April 25, 1882.

Application filed July 22, 1881. (No model.)

*To all whom it may concern:*

Be it known that I, ULRICH BOHREN, of the city and State of New York, have invented an Improvement in Faucets, of which the following is a specification.

This invention relates to the class of faucets in which the plug or barrel is of wood to prevent any injurious effects on the liquid.

In Letters Patent No. 171,646, granted to me, the body of the faucet is made of wood with a rubber seat for a glass ball, upon a rod that is moved back and forth by a crank. In this instance the rubber seat was liable to injury and the glass ball to adhere thereto.

My present invention is made for overcoming difficulties that have been experienced in my faucet patented as aforesaid; and said invention consists in the features of improvement hereinafter more fully set forth.

Figure 1:
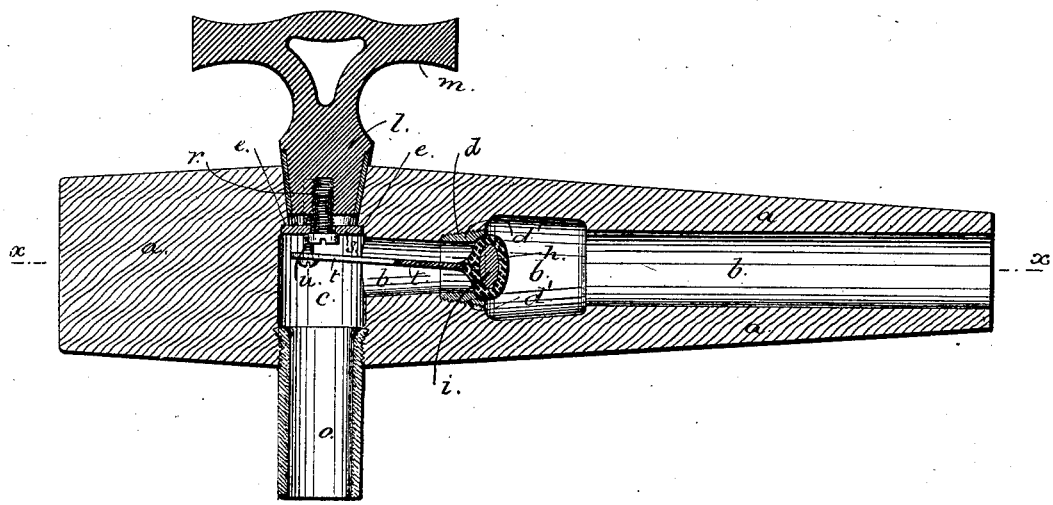
Figure 2:
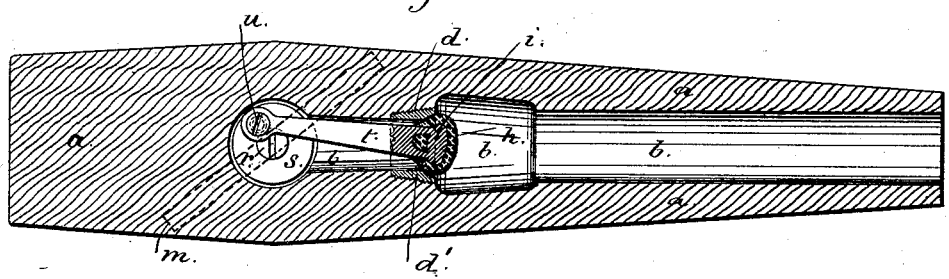

In the drawings, Figure 1 is a longitudinal section of said faucet, and Fig. 2 is an inverted sectional plan at the line $x$ $x$.

The body $a$ of the faucet is made of wood, preferably a hard close-grained wood. The end that enters the bung-hole is tapering, as usual. The hole $b$, that is bored from the back end, extends to the vertical hole $c$, that is bored across through the said body. It is to be understood that tools of the proper shape are used in boring out this body, so that there is a tapering seat at $d$ between the larger and the smaller portions of the hole $b$, and that there is a shoulder at $e$ between the lower straight portion of the hole $c$ and the upper tapering portion. The hole $b$ should also be enlarged to the rear of the seat $d$ to increase the size of the passage-way around the valve.

$o$ is the delivery-tube, made of metal and screwed into the wood, and the hole in the wood body is slightly enlarged at the inner end of said tube $o$, so that this part of the metal tube can be enlarged by a tool, so that the tube $o$, after it has been screwed in and its inner end spread, cannot be unscrewed.

The seat $d'$ is made of metal, and it is tapering upon the outside and provided with a screw-thread, so that when inserted into the tapering portion $d$ of the barrel it can be screwed firmly to place. A suitable tool is employed for screwing in this seat. It is preferably provided with chisel-shaped projections entering notches in the back end of the seat, so that after the seat has been screwed firmly to place the rotation of this tool will cut the end of the seat off smooth and in a shape adapted to the ball-valve $h$. This valve $h$ is of india-rubber, and it is spherical or spheroidal. The rubber surrounds the head $i$ of the valve-stem, and also passes through an opening in the stem $t$, the rubber being applied thereto previous to vulcanizing, and held in a mold, so that it becomes firmly connected to the stem and head when vulcanized.

The plug $l$ is slightly tapering, and I prefer to make the plug and handle $m$ of malleable iron, then to tin the same, and afterward cast a surface or coating of tin to form the plug, and turn off the surface tapering to fit into the tapering upper end of the hole $c$. The washer or disk $s$ is a little smaller than the interior of the hole $c$ and rests against the shoulder $e$. A screw, $r$, connects the washer $s$ and plug $l$, and the screw $u$ passes eccentrically through the washer $s$ and into the plug $l$. It also passes through the stem $t$ of the valve $h$ and forms a crank to open and close the said valve. By this construction the metal valve-seat is securely fastened into the wood and rendered smooth and true. The delivery-tube $o$ is firmly retained in the wood. The plug $l$, being tapering in a tapering hole, can be easily turned, even if the wood swells. The tinned surface of the plug is smooth and does not wear the wood. The plug is kept in its place by the washer $s$. The india rubber valve cannot separate from the metal stem. It will not adhere or stick to the metal valve-seat, and the whole faucet is durable and not liable to be injured by the liquid that is allowed to run through it, and when the valve is closed leakage is impossible. Besides this, the surface of the plug $l$ being tin, there is very little friction between the same and the wood body of the faucet, even when the wood is in a moist condition.

Metal faucet-bodies have been made with an enlargement of the passage-way at the rear of the valve-seat; but said bodies have been made in two parts connected together, which cannot be done in wooden faucet-bodies.

I claim as my invention—

1. The combination, in a faucet, of the wooden barrel, the tapering metal seat screwed into the wood, and an elastic valve closing against the seat, substantially as set forth.

2. The combination, in a faucet, of a wooden barrel and a metal delivery-tube, o, screwed into the wood and the inner end spread outwardly, substantially as set forth.

3. The combination, in a faucet, of a wooden barrel, a tapering metal plug having a tinned surface, and a handle, a washer, s, and attaching-screws to connect the washer to the plug, substantially as set forth.

4. The combination, in a faucet, of a wooden barrel, a tapering metal plug and handle, a disk, s, an elastic valve, a valve-stem, and a screw connecting the disk and plug, substantially as set forth.

5. In a faucet, the combination of a wooden barrel, a tapering metal valve-seat screwed into the wood barrel, a metal plug and handle, an elastic valve, a metal valve-stem, and an eccentric connection between the valve-stem and plug, substantially as set forth.

Signed by me this 19th day of July, A. D. 1881.

ULRICH BOHREN.

Witnesses:
GEO. T. PINCKNEY,
CHAS. H. SMITH.